United States Patent [19]
Carlin

[11] 3,778,030
[45] Dec. 11, 1973

[54] GATE VALVE
[75] Inventor: Bernard Carlin, Orange, Tex.
[73] Assignee: Billy J. Garrett, Orange, N.J.; a part interest
[22] Filed: Oct. 12, 1971
[21] Appl. No.: 188,192

[52] U.S. Cl. ................. 251/327, 251/355, 251/329
[51] Int. Cl. ...................... F16k 3/22, F16k 3/316
[58] Field of Search ................... 251/326, 327, 329, 251/355, 214

[56] References Cited
UNITED STATES PATENTS

| | | | |
|---|---|---|---|
| 2,923,310 | 2/1960 | Eckert, Jr. | 251/326 X |
| 2,797,062 | 6/1957 | Otter | 251/329 X |
| 1,572,922 | 2/1926 | Govers et al. | 251/355 X |
| 1,656,555 | 1/1928 | Brooks | 251/355 X |
| 2,322,269 | 6/1943 | Allen | 251/326 X |
| 2,214,000 | 9/1940 | Sifkovitz | 251/355 X |
| 3,111,137 | 11/1963 | Larlin | 251/329 X |

Primary Examiner—Arnold Rosenthal
Attorney—Alexander B. Blair

[57] ABSTRACT

A gate valve having a rising stem actuator sealed with pressure grease retainers and a pressure fitting on the valve. A cross member in the valve body extends through a slot in the gate valve piston to prevent the piston from rotating with respect to the valve stem and valve body.

2 Claims, 9 Drawing Figures

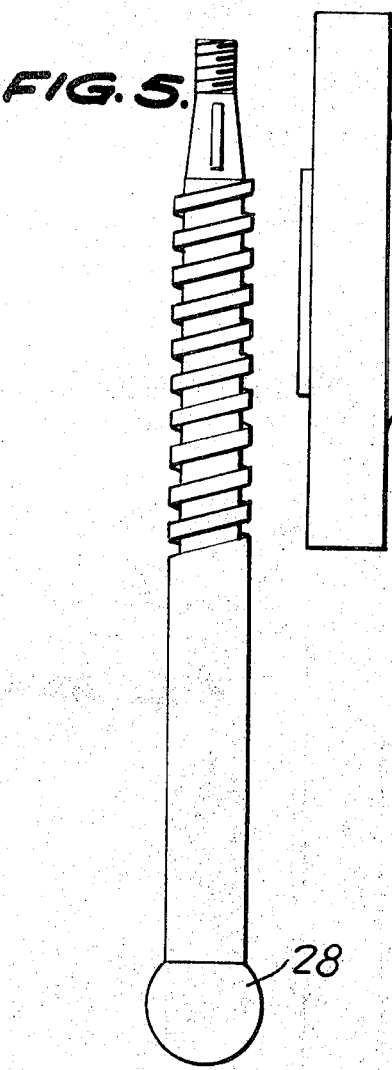
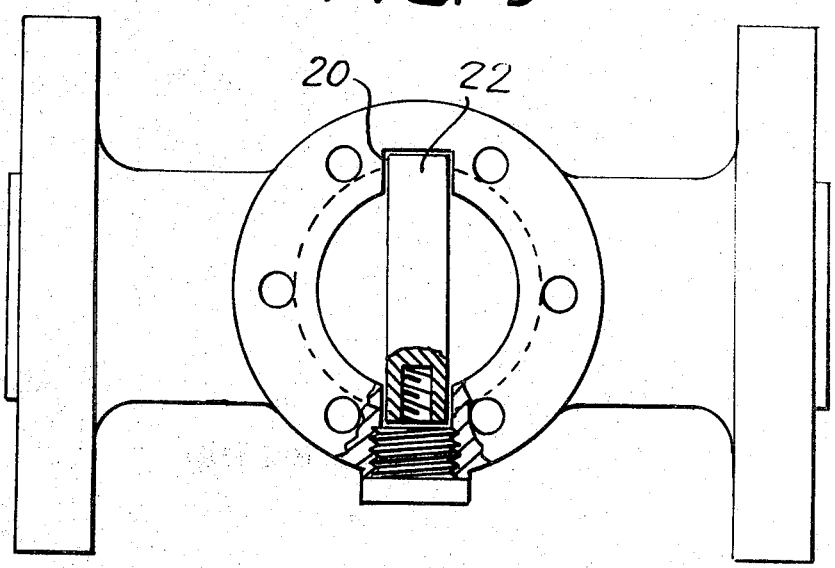
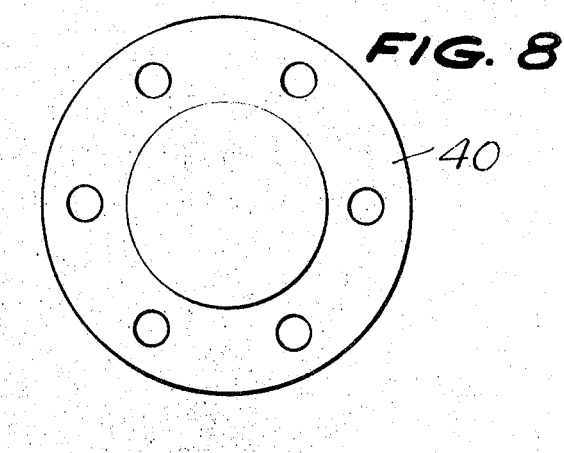
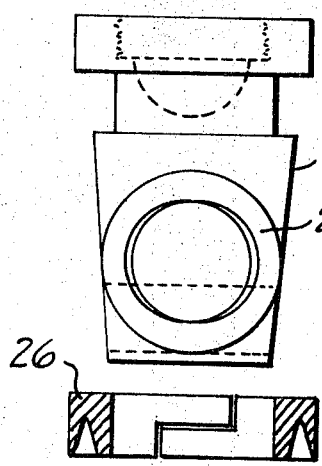
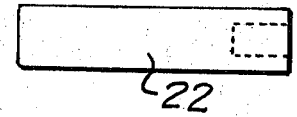

GATE VALVE

BACKGROUND OF THE INVENTION

Field of the Invention

The present invention relates to rising stem gate valves and particularly to rising stem gate valves of the type having a sealed stem.

Summary of the Invention

A rising stem gate valve having a fitting on the valve to serve as a sealing piston and having grease retainers engaging the stem to retain grease in contact with the threads on the stem to prevent galling of the threads.

The primary object of the invention is to provide a rising stem gate valve which will be free of leakage regardless of pressure and which utilizes a piston type seal combined with the valve piston disc.

Other objects and advantages will become apparent in the following specification when considered in the light of the attached drawings.

BRIEF DESCRIPTION OF THE DRAWINGS

FIG. 2 is a sectional view of the nut to secure the stem in the piston;

FIG. 3 is a side elevation of the valve gate with the piston ring removed;

FIG. 4 is a sectional view of the piston ring;

FIG. 5 is a side elevational view of the stem;

FIG. 6 is a side elevation of the oscillating pressure pin;

FIG. 7 in an end elevation of the pressure pin;

FIG. 8 is a bottom plan view of the bottom cap; and

FIG. 9 is a sectional view of the pressure pin in position in the side of the body of the valve.

Referring now to the drawings in detail wherein like reference characters indicate like parts throughout the several figures the reference numeral 10 indicates generally a gate valve constructed in accordance with the invention.

Figure 1:
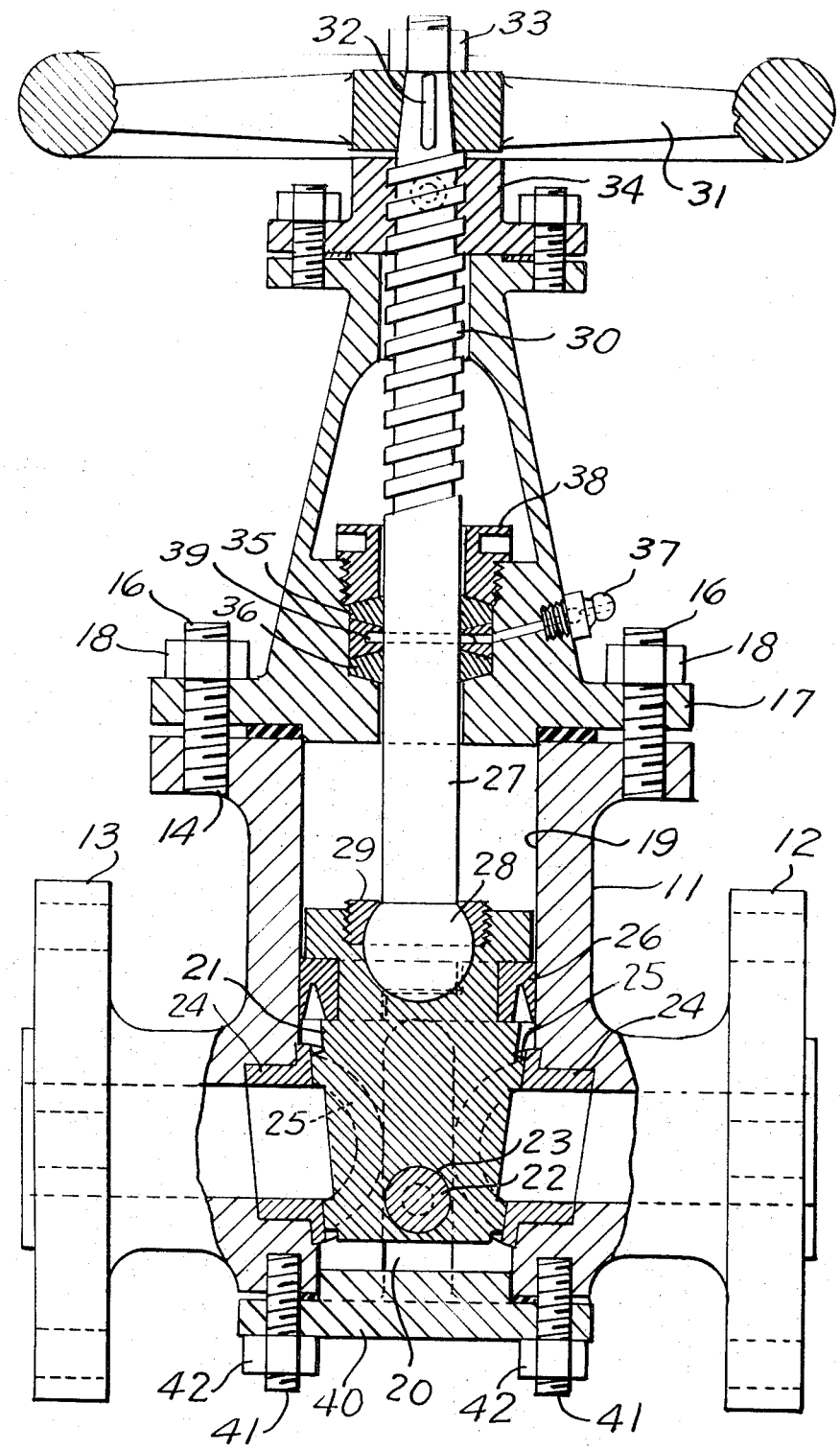
FIG. 1 is a side elevation of the invention shown partially broken away and in section for convenience of illustration.

The gate valve 10 includes a body 11 having oppositely disposed flanges 12, 13 for connecting the body 11 into a pipe line. A flange 14 is formed on the upper end of the body 11 for attaching a bonnet 15 thereto. Studs 16 extend upwardly from the flange 14 through a flange 17 on the bonnet 15 to receive nuts 18 securing the bonnet 15 to the flange 14. A bore 19 extends upwardly in the body 11 and has a pair of oppositely disposed vertical grooves 20 formed in the lower end thereof. A tapered generally circular valve piston disc 21 is mounted in the bore 19 for vertical movement therein. A pressure pin 22 extends through a bore 23 in the valve piston disc 21 and engages in the grooves 20 in opposite sides of the bore 19 to prevent the piston disc 21 from rotating in the bore 19. Replaceable seats 24 are mounted in the body 11 on opposite sides of the bore 19 to engage valve surfaces 25 formed on opposite faces of the valve piston disc 21.

A saddling pressure ring 26 is seated on the upper end of the valve piston disc 21 in engagement with the walls of the bore 19 to seal the valve piston disc 21 in the bore 19. A stem 27 has a ball 28 formed on its lower end in engagement with the valve piston disc 21. A nut 29 secures the ball 28 to the top of the valve piston disc 21 to permit the stem 27 to rotate without rotating the valve piston disc 21.

The stem 27 has a threaded upper portion 30 which extends above the bonnet 15 and has a control wheel 31 keyed thereto by key 32 and secured thereon by nut 33. The control wheel 31 is adapted to rotate the stem 27 and in cooperation with the nut 34 causes the stem 27 to raise and lower in the body 11 and bonnet 15. Grease retainers 35, 36 are mounted in the bonnet 15 surrounding the stem 27 and a grease fitting 37 is provided for feeding grease to the space surrounding the stem 27 between the grease retainers 35, 36. A packing gland 38 above the grease retainers 35, 36 assists in maintaining sealing pressure of the grease retainers 36, 36 against the valve stem 27. Grease is fed to the threaded portion 30 of the valve stem 27 in the nut 34 at 39 by a grease cup, not shown.

A cap 40 is secured over the bore 19 on the lower end of the body 11 by a plurality of studs 41 carrying nuts 42.

The shape of the throttling pressure ring 26 is such that pressure in the pipe line will expand the ring to increase its frictional engagement and sealing engagement with the walls of the bore 19. The throttling pressure ring 26 is step cut to provide a perfect seal.

Having thus described the preferred embodiment of the invention it should be understood that numerous structural modifications and adaptations may be resorted to without departing from the spirit of the invention.

I claim:

1. A gate valve comprising a body, a valve piston disc mounted for vertical movement in said body, a valve stem secured to said piston disc for moving said piston disc in said body, grease retainer means for maintaining a grease seal on said stem, said body having a vertical bore in which said valve piston disc reciprocates, a step cut throttle pressure ring secured to said valve and sealingly engaging said bore, said ring having an annular V-shaped lower face permitting said ring to be expanded upon application of pressure thereto, and means in said body extending through said valve piston disc to prevent rotation of said valve piston disc with respect to said body.

2. A device as claimed in claim 1 whrein said last-named means is an oscillating pressure pin extending through said valve piston disc and said body has a pair of grooves on opposite sides of said bore with said oscillating pressure pin engaging in said grooves at each end thereof.

* * * * *